United States Patent
Matheidas et al.

(10) Patent No.: US 10,132,412 B2
(45) Date of Patent: Nov. 20, 2018

(54) DEVICE AND METHOD FOR CONTROLLING ROTATING EQUIPMENT SEAL WITHOUT BUFFER SUPPORT EQUIPMENT

(71) Applicants: Michael T. Matheidas, The Woodlands, TX (US); Niran Singh Khaira, Spring, TX (US); Richard A. Huntington, Spring, TX (US)

(72) Inventors: Michael T. Matheidas, The Woodlands, TX (US); Niran Singh Khaira, Spring, TX (US); Richard A. Huntington, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 23 days.

(21) Appl. No.: 15/229,704

(22) Filed: Aug. 5, 2016

(65) Prior Publication Data

US 2018/0038488 A1 Feb. 8, 2018

(51) Int. Cl.
*F16J 15/40* (2006.01)
*F16J 15/43* (2006.01)
*F16J 15/34* (2006.01)

(52) U.S. Cl.
CPC .......... *F16J 15/43* (2013.01); *F16J 15/346* (2013.01); *F16J 15/3444* (2013.01); *F16J 15/3492* (2013.01)

(58) Field of Classification Search
CPC ...... F16J 15/34; F16J 15/3404; F16J 15/3436; F16J 15/3444; F16J 15/3492
See application file for complete search history.

(56) References Cited

U.S. PATENT DOCUMENTS

| | | | |
|---|---|---|---|
| 4,447,063 A | 5/1984 | Kotzer et al. | 277/80 |
| 4,497,493 A | 2/1985 | Sall et al. | 277/2 |
| 4,643,437 A * | 2/1987 | Salant | F16J 15/3432 277/319 |
| 5,064,205 A * | 11/1991 | Whitford | F16J 15/3436 277/317 |
| 5,696,412 A | 12/1997 | Iannello | 310/90.5 |
| 5,736,800 A | 4/1998 | Iannello et al. | 310/90.5 |
| 5,925,957 A | 7/1999 | Chapman | 310/90.5 |
| 6,746,019 B1 | 6/2004 | Liebenberg et al. | 277/410 |

(Continued)

FOREIGN PATENT DOCUMENTS

| | | | |
|---|---|---|---|
| DE | 3444175 | 3/1986 | ............... F16J 15/34 |
| JP | S6337-000869 | 3/1988 | ............... F16J 15/34 |
| JP | 04000073 A * | 1/1992 | |

*Primary Examiner* — Gilbert Y Lee
(74) *Attorney, Agent, or Firm* — ExxonMobil Upstream Research Company Law Department (57) ABSTRACT

A method and system for actively controlling an axial separation between a seal face of a stationary ring and a seal face of a rotating ring of a gas seal is disclosed. At least one property is sensed indicative of a condition of at least one of the seal faces. With at least one sensing device, a characteristic of the axial separation between the seal faces is sensed. A net magnetic force of at least one magnetic device is adjusted based on the property and/or the characteristic. Adjusting the net magnetic force adjusts the axial separation between the seal faces. Without using a buffer gas between the seal faces, flow of gas or other fluid is controlled between the seal faces by adjusting the axial separation.

32 Claims, 6 Drawing Sheets

(56) References Cited

U.S. PATENT DOCUMENTS

| | | | |
|---|---|---|---|
| RE41,035 E | 12/2009 | Ohtachi et al. | 310/90.5 |
| 8,584,514 B2 | 11/2013 | Tecza et al. | 73/112.01 |
| 2007/0212238 A1 | 9/2007 | Jacobsen et al. | 417/423.1 |
| 2008/0042364 A1 | 2/2008 | Zheng et al. | 277/378 |
| 2009/0008881 A1* | 1/2009 | Lee | F16J 15/445 277/412 |
| 2010/0072706 A1 | 3/2010 | Schmitz et al. | 277/301 |
| 2014/0037422 A1 | 2/2014 | Gilarranz et al. | 415/1 |
| 2017/0045144 A1 | 2/2017 | Khaira et al. | 277/302 |

* cited by examiner

DEVICE AND METHOD FOR CONTROLLING ROTATING EQUIPMENT SEAL WITHOUT BUFFER SUPPORT EQUIPMENT

CROSS-REFERENCE TO RELATED APPLICATIONS

This patent application is related to U.S. Provisional Patent Application No. 62/203,074, titled "DEVICE AND METHOD FOR MAGNETICALLY CONTROLLED DRY GAS SEAL", the disclosure of which is incorporated by reference herein in its entirety.

BACKGROUND

Field of Disclosure

The invention relates to rotating machinery, and more specifically, to reducing the occurrence of failure of seals used in rotating machinery.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

The use of seals, such as dry gas seals (DGS) on compressors in the oil & gas, refining, petrochemicals and other industries is pervasive; yet despite decades of experience and technological advancements the failures of these devices persist. Some failures can certainly be attributed to increasing pressure requirements, more difficult gas compositions, and functional requirements. The greatest proportion of DGS failures are caused by operational difficulties of the buffer gas supply system which may allow the buffer gas to be contaminated with liquid, water and/or solids. Others may be attributed to changes in the technology of DGS that aim to reduce leakage rates but that also increase the sensitivity of the DGS to contamination. In addition, the buffer gas or vent systems may allow reverse pressurization or other imbalances within the DGS system. These contaminants and imbalances may interrupt the film between the seal faces and cause the faces to contact that can induce rapid heating due to friction and consequential material failure due to a duplicity of failure modes. Examples of operational causes include overloaded filters, condensation due to failure or absence of buffer gas heaters, mis-operation, failure to adjust system performance for changing gas conditions, etc.

One of the main causes of dry gas seal failure is the breakdown of the dynamic gas film between the rotating and stationary seal faces. This dynamic gas film is essential to the correct operation of a typical DGS and may be characterized by a dynamic film pressure between the rotation and stationary faces. This film further maintains a proper separation of the faces and the gas flow within the film may remove excess heat and contaminants. The breakdown of the film may occur because of liquid formation and/or ingress in the seal gas, or because of reverse pressurization of the seal gas. When DGS failure occurs, the seal faces may come into contact during machine operation and the increase in temperature may cause the rotating and/or stationary ring to wear and/or fracture.

Having the ability to maintain a minimum clearance or separation between the DGS stationary and rotating seal faces independent of a dynamic film pressure allows operation of seals during conditions where the dynamic gas film is lost while the machine is in operation. Without this clearance, the seal faces would come in contact and potentially fail the seal.

SUMMARY

In an aspect, a method is provided for actively controlling an axial separation between a seal face of a stationary ring and a seal face of a rotating ring of a gas seal. At least one property is sensed indicative of a condition of at least one of the seal face of the stationary ring and the seal face of the rotating ring. There is sensed, with at least one sensing device, at least one of (i) the axial separation between the seal face of the stationary ring and the seal face of the rotating ring, and (ii) the time rate of change of the axial separation. A net magnetic force of at least one magnetic device is adjusted based on the at least one property and at least one of the sensed axial separation and the sensed time rate of change of the separation. Adjusting the net magnetic force of the at least one magnetic device adjusts the axial separation between the seal face of the stationary ring and the seal face of the rotating ring. Without using a buffer gas between the seal faces, flow of gas or other fluid between said seal faces is controlled by adjusting the axial separation.

In another aspect, a gas seal system is provided, which includes a stationary ring having a seal face and a rotating ring having a seal face positioned adjacent the stationary ring seal face. The rotating ring is configured to rotate about an axis with respect to the stationary ring. The stationary ring and/or the rotating ring are configured to move axially with respect to each other. A first sensor is configured to sense at least one property indicative of a condition of at least one of the stationary ring seal face and the rotating ring seal face. A second sensor is configured to sense at least one of (i) the axial separation between the stationary ring seal face and the rotating ring seal face, and (ii) a time rate of change of the axial separation. A controller adjusts a net magnetic force of at least one magnetic device based on the at least one property and at least one of the sensed axial separation and the sensed time rate of change of the separation. Adjusting the net magnetic force adjusts the axial separation to thereby control, without using a buffer gas, flow of a gas or other fluid therethrough.

BRIEF DESCRIPTION OF THE DRAWINGS

These and other features, aspects and advantages of the disclosure will become apparent from the following description, appending claims and the accompanying drawings, which are briefly described below.

DETAILED DESCRIPTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention. For purposes of clarity and brevity, similar reference numbers in the several Figures represent similar items, steps, or structures and may not be described in detail in every Figure.

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended so as to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

In an aspect of the disclosure, magnets are used as a means to control seals, such as dry gas seals. One or more sensors may be disposed around the circumference of a rotating shaft or other rotating machinery. A controller/computer may be connected to the sensors and provides signals representative of various sensed properties. One or more power amplifiers may be connected to outputs of the controller/computer. One or more electromagnets may be disposed around the circumference of the shaft for any dry gas seal configuration, to manipulate the seal ring, which may be a dry gas seal ring. The electromagnets may be controlled by signals from the controller/computer as amplified by the one or more amplifiers and can be controlled thereby to adjust the clearance or gap between the stationary ring and the rotating ring of the seal. The device so described may be externally powered or use energy harvesting solutions, deriving or generating power. In this aspect, the spring used in conventional primary ring retainer assemblies (such as primary DGS retainer assemblies) may be eliminated. The controller/computer may accept other inputs to influence the ring. The controller/computer may output signals that may be beneficial for monitoring/control.

In another aspect where magnets may be used to control seals such as dry gas seals, one or more passive magnets may self-adjust the seal ring position for any seal configuration, to maintain a clearance between the stationary ring and the rotating ring of the seal assembly. This device so described may be used to eliminate the spring used in conventional primary ring retainer assemblies.

In another aspect where magnets may be used as a means to control seals such as dry gas seals, one or more passive magnets are fixed, thereby keeping a minimum clearance between the stationary ring and the rotating ring of the seal rings, for any seal configuration.

According to further aspects disclosed herein, problems associated with seal failure may be eliminated by actively controlling the axial distance between stationary and rotating seal faces during all phases of operation, thereby preventing them from touching. This improves the ability of the seal to meet functional performance even in the presence of contaminants. According to disclosed aspects, the buffer gas supply may be deleted, the gas supply inlet port may be plugged, and the seal may be run in the gas environment of the compressor. The axial distance between the stationary and rotating seal faces may be modulated on start-up and shutdown, if needed, to minimize the impact of whatever limited contaminants (usually solids) that may migrate from the compressor, across the process labyrinth and into the seal chamber. Seals with this type of active control need not maintain a differential supply or have spiral grooves, T-grooves, or other aerodynamic features currently known in the art to create a running film between the seal faces.

Figure 1:
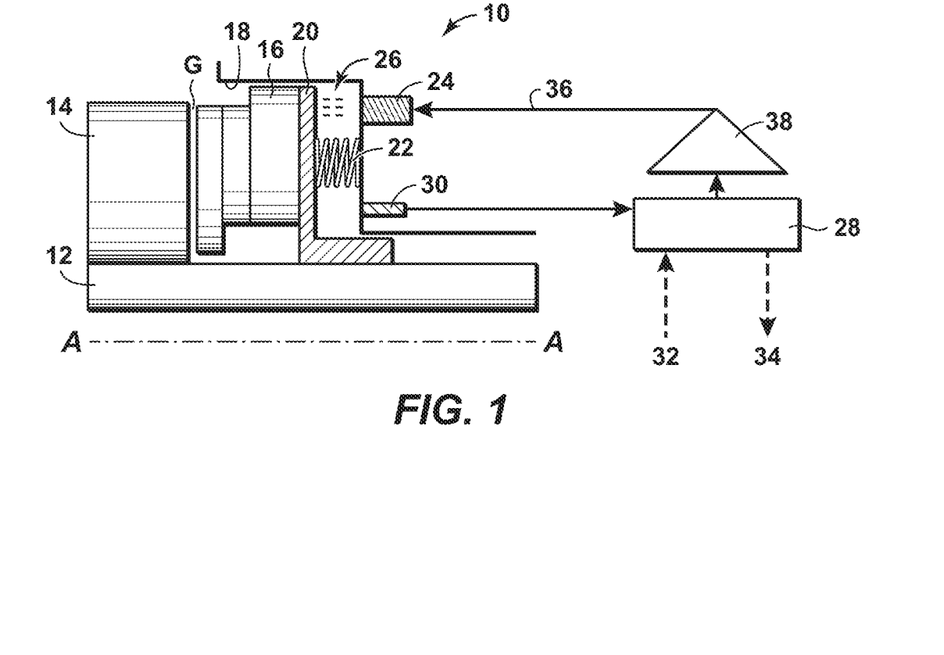
FIG. 1 is a schematic diagram of an aspect of the disclosure showing the addition of active magnets and sensors to control the gap between the seal faces of a seal assembly.

FIG. 1 is a schematic view of a dry gas seal (DGS) system 10 according to an aspect of the disclosure. A machinery element, such as a shaft 12, rotates around an axis of rotation collinear with or parallel to line A-A. The machinery element may be part of a turbine, pump, or the like. A rotating ring 14 is configured to rotate with the shaft 12. A primary ring 16 may be disposed within a recess 18 and may be configured to face the rotating ring 14 in a manner such that a gap G is maintained between the two rings. The primary ring may be mounted on a ring mount 20, which is made of or includes a ferromagnetic or other magnetically reactive material. The primary ring 16 and ring mount 20 are configured to not rotate around the axis of rotation, but may be movable in a direction substantially parallel to the axis of rotation so that the size of gap G may be modified according to principles disclosed herein.

The axial position of the primary ring 16 may be controlled by the combination of a spring 22 and one or more controllable magnets, represented in FIG. 1 by an electromagnet 24, which is disposed around the circumference of shaft 12. The spring 22, which is situated between recess 18 and ring mount 20, biases the primary ring 16 toward the rotating ring 14 to decrease gap G. The electromagnet 24 creates a magnetic field 26 that urges the magnetically reactive ring mount 20 and primary ring 16 in a direction away from rotating ring 14, to thereby increase gap G. The magnetic field may be varied using a controller 28 that responds to signals from one or more sensors, which are represented in FIG. 1 as a sensor 30. A temperature sensor is an example of a sensor that may be used individually or in combination with the described aspects. Other types of sensors may include those capable of sensing other properties of a gas or other fluid associated with the DGS system. Such properties may include pressure, composition, viscosity, density, fluid velocity, and fluid vaporization fraction. These sensed properties may be used to estimate the stiffness of a gas or fluid film (not shown) within Gap G. The size of gap G may be controlled based on the sensed temperature, the estimated film stiffness, and the amount of cooling required. Another type of sensor is a position, clearance, or gap sensor, which permits control of the size of gap G clearance based on the minimum amount of clearance required between rotating ring 14 and primary ring 16. Still another type of sensor is one that detects the time rate of change of position, clearance or gap. This type of sensor permits the addition of damping to the control of gap G as damping is a force related to the velocity or relative velocity of elements of the DGS system 10. One method of obtaining a measurement of a time rate of change may comprise taking the time derivative of the signal of the position, clearance or gap sensor. Another method may be to use a sensor that is directly sensitive to the velocity or relative velocity of the components of the DGS system 10. Still another method may be to integrate the signal of an acceleration sensitive sensor (e.g., an accelerometer) mounted on one or more components of the DGS system 10. Controller 28 may accept other inputs to influence the DGS system 10, and/or may output signals, such as a monitoring signal, that may be beneficial for monitoring/control. These inputs and outputs are represented in FIG. 1 at reference numbers 32 and 34, respectively.

Based on the signals received from the one or more sensors 30 (and optionally from input 32), controller 28 sends a control signal 36, amplified using a power amplifier 38, to vary the magnetic field 26 generated by electromagnet 24. When magnetic field 26 creates a force equal to the bias of spring 22, primary ring 16 does not move axially with respect to rotating ring 14. When magnetic field 26 creates a force less than or greater than the bias of spring 22, primary ring 16 axially moves toward or away from rotating ring 14. By controlling the relative positions of the primary ring relative to the rotating ring, the size of gap G may be controlled as desired.

Figure 2:
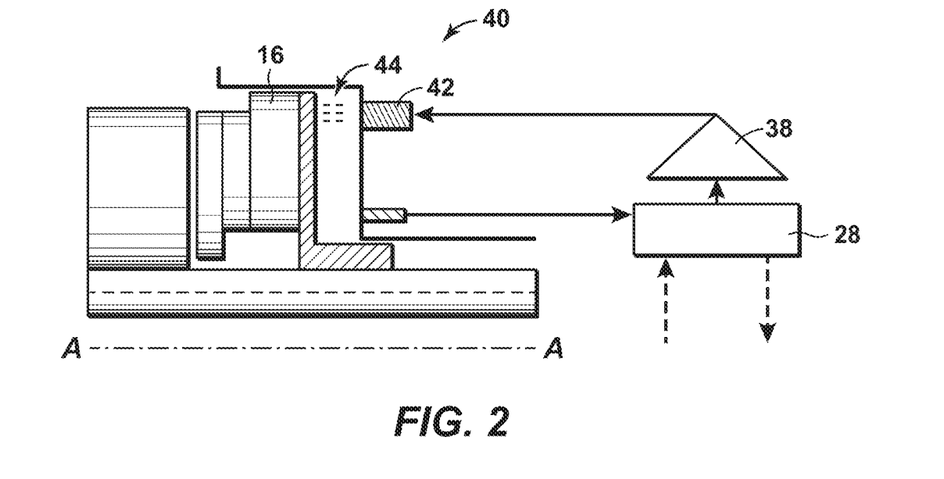
FIG. 2 is a schematic diagram of a seal assembly according to another aspect of the disclosure.

It is possible that electromagnet 24 may generate a reversible magnetic field 26 that is sufficiently strong to selectively move primary ring 16 both toward and away from rotating ring 14. In such a circumstance, the bias of spring 22 may not be necessary to move the primary ring toward the rotating ring, and the spring may therefore be eliminated from the DGS system 10. FIG. 2 is a schematic view of a DGS system 40 according to another aspect of the present disclosure that is substantially identical to aspects disclosed in FIG. 1, with like reference numbers indicating similar elements. DGS system 40 differs from DGS system 10 in that the spring 22 of DGS system 10 is eliminated. The electromagnet 42 may be configured to generate a reversible magnetic field 44 to effectuate bi-directional axial movement of the primary ring 16. Alternatively, the electromagnet may comprise one or more electromagnetic elements, where the polarity of some of the electromagnetic elements is opposite the polarity of others of the electromagnetic elements. Controller 28 activates selected ones of the electromagnetic elements depending on the direction the primary ring 16 is to move.

Some or all of the power required for powering the controller 28, power amplifier 38, the one or more sensors 30, and/or electromagnet 24 may be generated using an energy harvesting strategy or device. The energy harvesting may be accomplished by harnessing the rotating movement of the shaft 12 or other rotating machinery element, the axial movement of the rings or other axially moving parts, or a combination of rotating and axial movement of a part or parts of the machinery or DGS system. Furthermore, the energy harvesting may be accomplished using heat, pressure, flow, and/or electromagnetic flux variations of one or more parts of the machinery or DGS system.

Figure 3:
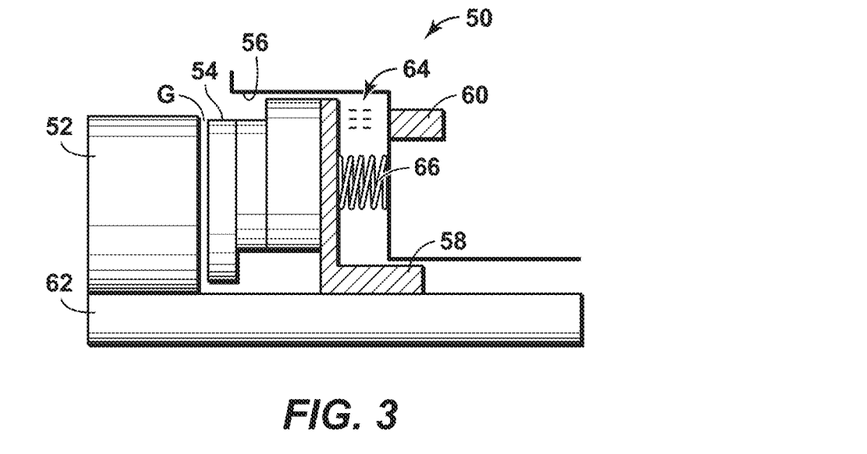
FIG. 3 is a schematic diagram of a seal assembly according to another aspect of the disclosure.

FIG. 3 is a schematic diagram of a DGS system 50 according to another aspect of the disclosure. DGS system 50 includes a rotating ring 52, a non-rotating primary ring 54, a recess 56, and a ring mount 58 as shown in the previous Figures. However, the magnetic force of DGS system 50 is not provided by one or more controllable electromagnets, but instead is provided by one or more passive or permanent magnets 60 arranged around the circumference of a shaft 62 or other rotating element. The passive magnets provide a constant magnetic field 64 to counteract the opposing bias of the spring 66. In general, a magnetic force between two objects is proportional to the inverse of the square of the distance between the two objects, while a spring force is linear with distance. Balancing the force of spring 66 with the magnetic force of the passive magnets results in a cubic equation that can be solved to find the characteristic distance between ring mount 58 and passive magnet 60, and by implication, the magnitude of gap G. It is therefore possible to select the number and/or magnetic strength of passive magnets 60 and spring 66 to provide a self-adjusting maintenance of the gap G between the rotating ring 52 and the primary ring 54. As the passive magnets are designed to not be controlled, the aspect shown in FIG. 3 contains no controllers, sensors, or power amplifiers. Possible sources of damping may include friction damping, squeeze film damping of the gas film within the gap G or another volume (such as a volume between recess 56 and ring mount 58), or the like. Additionally, the stiffness of the gas film between the faces of rotating ring 52 and primary ring 54 must be combined with the stiffness of spring 66 to determine the magnitude of gap G. Depending on the geometry of the seal faces, the gas film stiffness may vary and may be a positive or a negative stiffness.

Figure 4:
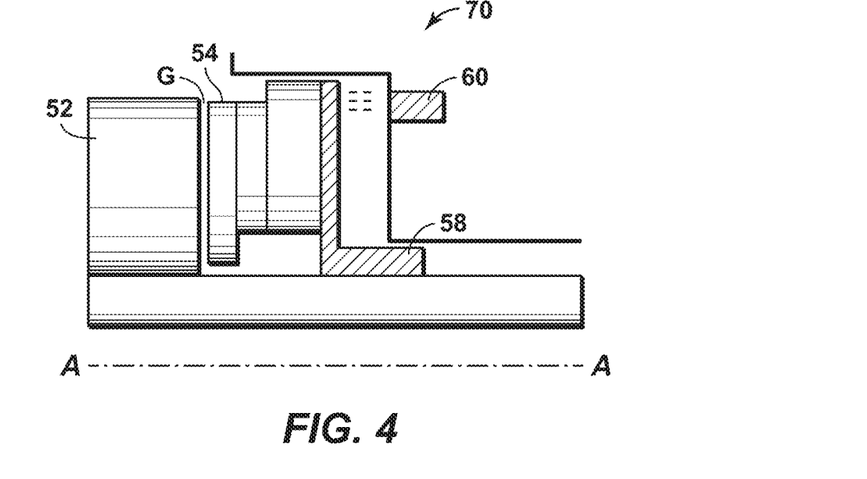
FIG. 4 is a schematic diagram of a seal assembly according to still another aspect of the disclosure.

FIG. 4 is a schematic diagram of a DGS system 70 according to still another aspect of the disclosure similar to what is shown in FIG. 3. However, the spring 66 of FIG. 3 is eliminated in DGS system 70. The gap G is controlled solely by the passive magnets 60. The passive magnets may be oriented such that some of the magnets have reversed polarity. In this aspect, the magnetic field of some of the passive magnets move the ring mount 58 and primary ring 54 away from the rotating ring 52 in a direction substantially parallel to the line A-A, and the magnetic field of the remaining passive magnets prevent the ring mount 58 from getting too close to the passive magnets. Such an arrangement maintains the gap G as desired.

Figure 7A:
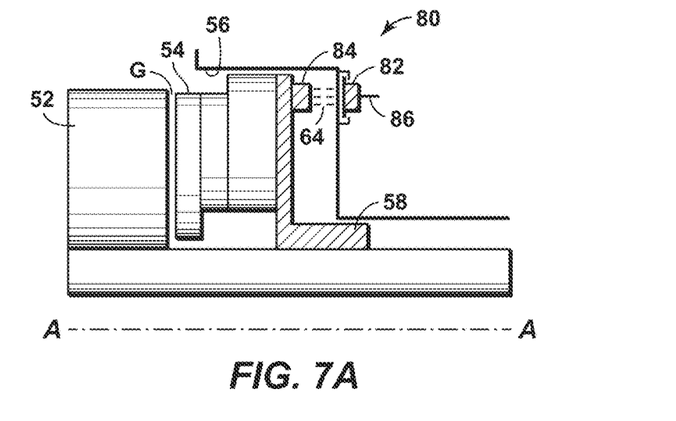
FIG. 7A is a schematic diagram of a seal assembly according to yet another aspect of the disclosure.
Figure 7B:
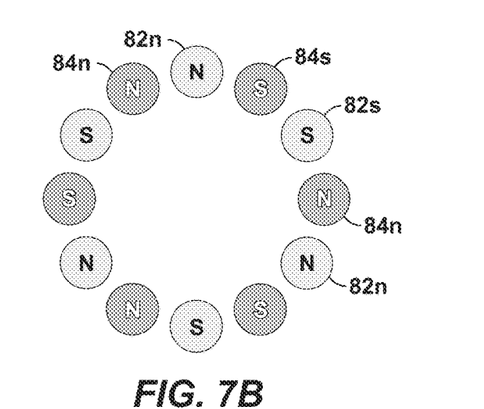
FIGS. 7B, 7C, and 7D show various configurations of the magnets of FIG. 7A.
Figure 7C:
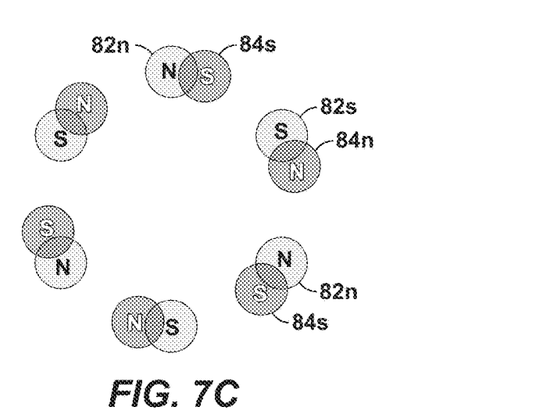
Figure 7D:
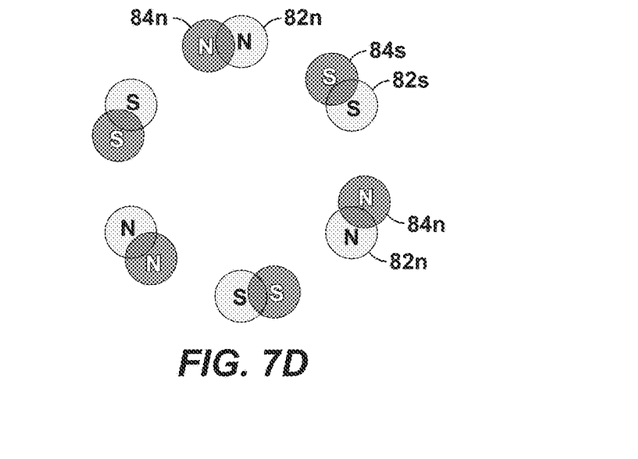

An alternative embodiment of the passive magnet arrangement of FIG. 4 is shown in the DGS system 80 of FIG. 7A. In system 80, a first array of passive magnets 82 is arranged on recess 56, and a second array of passive magnets 84 is arranged on ring mount 58. As illustrated in FIG. 7B, each of the first and second arrays 82, 84 have passive magnets alternately arranged with opposing polarities. In other words, the passive magnets of first array 82 include a first set of magnets 82*n* marked with an "N" representing a north polarity, and a second set of magnets 82*s* marked with an "S" representing a south polarity; likewise, the passive magnets of second array 84 include a first set of magnets 84*n* marked with an "N" representing a north polarity, and a second set of magnets 84*s* marked with an "S" representing a south polarity. At least one of the arrays of passive magnets 82, 84 is provided with a system to rotate, relative to the other array 84, 82, around an axis collinear with or parallel to axis A-A. In FIG. 7A, first array 82 is moveable with respect to second array 84. System 80 includes an actuator 86 to provide precise and repeatable positioning of the passive magnets in first array 82 with respect to the passive magnets in second array 84 so that the magnetic force applied axially between recess 56 and ring mount 58 may be used to actively control the gap G between the seal faces of rotating ring 52 and primary ring 54. Specifically, changing the relative angular position between the passive magnets of the first and second arrays 82, 84 continuously varies the magnetic force from a strong repellant force to a strong attractive force. For example, the approximate position of the passive magnets in first and second arrays 82, 84 as shown in FIG. 7B has magnets of one polarity evenly positioned between other magnets that have the opposite polarity of each other such that the net force is about zero. In FIG. 7C the moveable array (in this example, first array 82) has been rotated such that magnets of opposite polarity (e.g., 82*n* and 84*s*; 82*s* and 84*n*) interact to a greater extent than magnets with similar polarities. The position of the magnets shown in FIG. 7C may cause an attractive force between the first and second arrays 82, 84 and may cause the gap G to close. In FIG. 7D, the moveable array (in this example, first array 82) has been rotated such that the magnets of similar polarity (i.e., 82*n* and 84*n*; 82*s* and 84*s*) interact to a greater extent than magnets of opposing polarities. The position of the magnets shown in FIG. 7D may cause a repellent force between the first and second arrays 82, 84 and may cause the gap G to open. By adjusting actuator 86 under the control of controller 28 previously described, the seal gap may be actively controlled. It should be noted that the arrangement of the first and second arrays 82, 84, as well as the number and shape of the associated magnets in FIGS. 7A-D, are for illustration only. Any number of magnets may be included in the arrays and many shapes may be considered to improve the performance of the overall seal gap control system.

Using one or more magnets to control the gap or clearance between rings in a dry gas seal provides other opportunities for improvement in the design and operation of the dry gas seal. For example, the disclosed DGS system may be used to exercise/stroke/pulse the DGS in controlled situations, for example prior to machine startup. The disclosed DGS system may be used to keep the DGS open after the associated machinery has shut down and has been depressurized. The disclosed DGS system may be used to free DGS dynamic sealing element "hang-up" as required. The disclosed DGS system may be used to free DGS seal faces when seized together with contamination. The disclosed DGS system may be used to optimize parallelism of elements to compensate for design or assembly tolerance. Additionally, the disclosed DGS system may be used to keep seal elements from moving axially with every rotation if the rings, alone or together, are subjected to axial "swash"/misalignment (i.e. keeping faces of the rings perpendicular to the shaft). The disclosed DGS system may also be used to modify seal face gap clearances in a non-uniform manner to compensate for liquid pooling or other effects of contamination (i.e. seal faces are not parallel to each other). Also, to the disclosed DGS system may be used to create oscillating variations in the gap and create a pumping action between the stationary and rotating rings.

Figure 5:
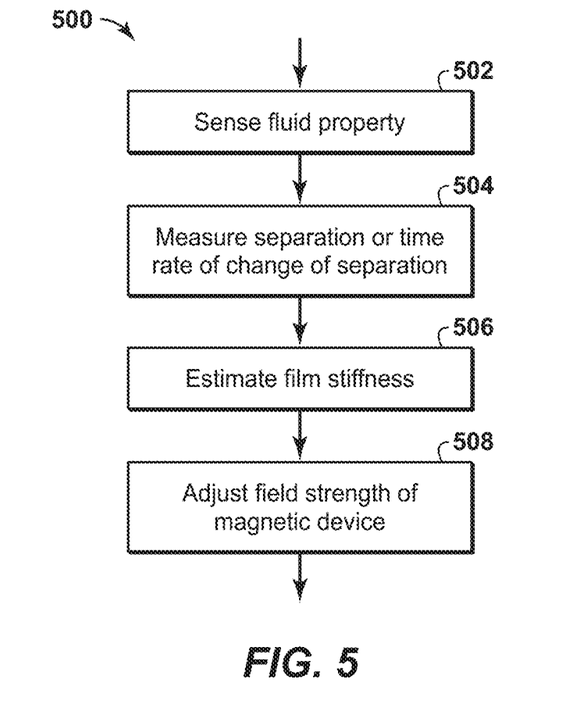
FIG. 5 is a flowchart showing a method according to disclosed aspects.

FIG. 5 is a flowchart 500 of a method to control an axial separation between a rotating ring and a stationary ring of a dry gas seal, wherein the dry gas seal restricts the leakage of a gas or other fluid to or from a rotating device, according to disclosed aspects. At block 502 at least one property of the gas or other fluid is sensed. At block 504 at least one of (i) the axial separation between the rotating ring and the stationary ring, and (ii) a time rate of change of the axial separation, is measured. At block 506 a stiffness of a film between the rotating ring and the stationary ring is estimated. The film comprises a gas or other fluid. At block 508 a field strength of at least one magnetic device is adjusted based on at least two of the sensed axial separation, the sensed time rate of change of the axial separation, and the estimated film stiffness. Adjusting the field strength of the at least one magnetic device adjusts and controls the axial separation between the rotating ring and the stationary ring.

Figure 6:
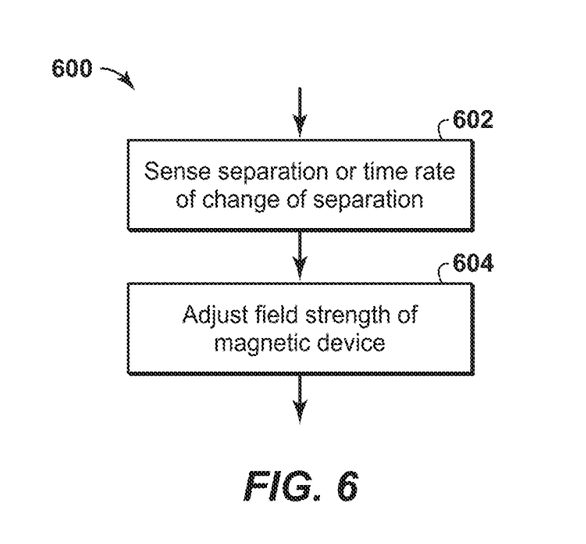
FIG. 6 is a flowchart showing a method according to disclosed aspects.

FIG. 6 is a flowchart 600 of a method of controlling an axial separation between a rotating ring and a stationary ring of a dry gas seal, wherein the dry gas seal restricts the leakage of a gas or other fluid to or from a rotating device, according to disclosed aspects. At block 602 at least one sensing device is used to sense (i) the axial separation between the rotating ring and the stationary ring, and (ii) a time rate of change of the axial separation. At block 604 a field strength of at least one magnetic device is adjusted using the sensed axial separation and the time rate of change of the axial separation. Adjusting the field strength of the at least one magnetic device adjusts and controls the axial separation between the rotating ring and the stationary ring.

As previously discussed, problems associated with seal failure may be eliminated by actively controlling the axial distance between stationary and rotating seal faces during all phases of operation, thereby preventing them from touching. This improves the ability of the seal to meet functional performance even in the presence of contaminants. According to disclosed aspects, the buffer gas supply may be deleted, the gas supply inlet port may be plugged, and the seal may be run in the gas environment of the compressor. The axial distance between the stationary and rotating seal faces may be modulated on start-up and shutdown, if needed, to minimize the impact of whatever limited contaminants (usually solids) that may migrate from the compressor, across the process labyrinth and into the seal chamber. Seals with this type of active control need not maintain a differential supply or have spiral grooves, T-grooves, or other aerodynamic features currently known in the art to create a running film between the seal faces. Furthermore, a pressure sensing device may be the only sensor necessary to measure the leakage between the rotating seal faces. Such a pressure sensing device may permit calculation of leakage from the measured seal gap or an equivalent orifice, suction pressure, and/or vent pressure, which is the delta pressure across the seal.

In an aspect of the disclosure, the seal gap may be actively controlled based on a sensing parameter of the seal chamber, such as pressure. Alternatively, the seal gap may be actively controlled based on the temperature of the seal ring. Either pressure or temperature may be an indicator of the seal condition and/or may indicate the presence of contaminants. In an aspect, contaminants are sensed or predicted based on pressure or temperature signals, the seal faces are controlled to increase the seal gap so that the seal faces are cooled and/or the contaminants are permitted to pass through the seal, and the seal gap is then returned to a normal operation.

Figure 8:
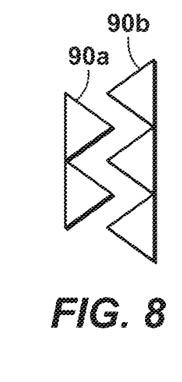
FIG. 8 is a side elevational view of a seal face geometry that may be implemented according to disclosed aspects.
Figure 9:
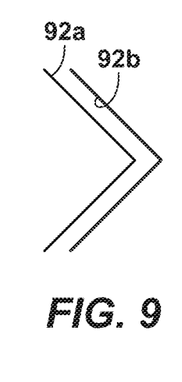
FIG. 9 is a side elevational view of a seal face geometry that may be implemented according to disclosed aspects.
Figure 10:
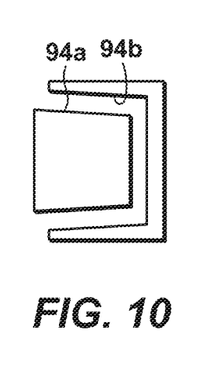
FIG. 10 is a side elevational view of a seal face geometry that may be implemented according to disclosed aspects.
Figure 11:
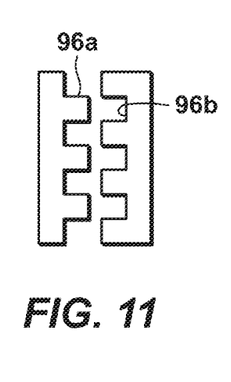
FIG. 11 is a side elevational view of a seal face geometry that may be implemented according to disclosed aspects.
Figure 12:
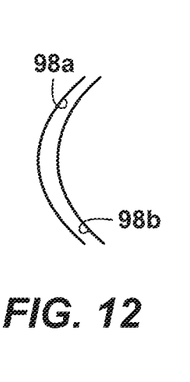
FIG. 12 is a schematic diagram of a seal assembly according to disclosed aspects.

In an aspect, the seal faces are flat, and as such have no surface features that could generate a pressure increase of a gas film between the seal faces although the gas film may still have a film stiffness relative to changes in the local or average film thickness. In another aspect as shown in FIGS. 8-12, the seal faces may have any of a variety of geometries to create a tortuous path for gas passing therebetween. Such geometries may or may not be parallel to each other or perpendicular to the shaft. The geometries of the seal faces may be described as mating, or in other words, having shapes that are generally complementary with each other. In an aspect, the geometries of the seal faces may include tapers, chamfers, fillets, and/or bevels. In another aspect, the geometries of the seal faces may include complementary contours, such as spherical or frusto-spherical contours (as shown at 98a, 98b in FIG. 12) or conical or frusto-conical contours (as shown at 92a, 92b in FIG. 9). In another aspect, the geometries of the seal faces may include mating or complementary complex geometries, such as a labyrinthine design. In yet another aspect, the geometries of the seal faces may be toothed or embattled, as shown at 96a, 96b in FIG. 11. FIGS. 8 and 10 show additional complementary geometries of seal faces at 90a, 90b and 94a, 94b, respectively. The seal face designs disclosed herein are non-limiting.

With active control of the separation distance between the seal faces, the seal faces do not need to have high temperature resistance, and therefore do not need to be made of a ceramic or ceramic derivative material, as is currently done with most faces of seal rings. Instead the faces of the seal rings may be made of any of a variety of materials, such as common metals, polymers, ceramics, or the like. In a preferred aspect, such faces may have a low friction coating applied thereto, such as polytetrafluourethylene (PTFE).

By actively controlling the minimum clearance between the stationary and rotating seal faces (typically on the order of 0.002" or less), the seal may be operated during conditions where the dynamic gas film is lost while the machine is in operation. Without this clearance, the seal faces would come in contact and likely fail.

It is possible that liquids may form within the seal due to Joule-Thompson (JT) effects, but the likelihood of failure due to liquid between the faces if they are actively controlled is substantially reduced. For certain applications where this could be a concern, the suction side seal could be controlled with a slightly wider gap.

In general removal of the buffer system will expose the seal to more contaminants from the compressor stream (iron oxides, dust, small solids from upstream systems, etc.). These contaminants may migrate across the process labyrinth and into the seal faces. Buildup of such contaminants on the seal faces may limit the ability of the various seal face features (spiral grooves, T-grooves, flow dams, etc.) to generate lift and thus to maintain proper separation between the rotating and stationary faces. As discussed before, this can lead to face contact, overheating or other failure mechanisms. The active control of the seal face clearance by the various methods described herein provide a means to maintain the correct seal face clearance to avoid the said face contact, overheating or other failure mechanisms even with contamination of the seal faces. Some operators have experience successfully running dry gas seals with the buffer system closed but without active control of the DGS clearance. Certain process services such as C3 or other closed loop systems may have longer run times than severe duty compressors in a fouling service. But these are limited cases that do not offer a means to eliminate the buffer system without undue added risk of unreliable operation and equipment failure.

Figure 13:
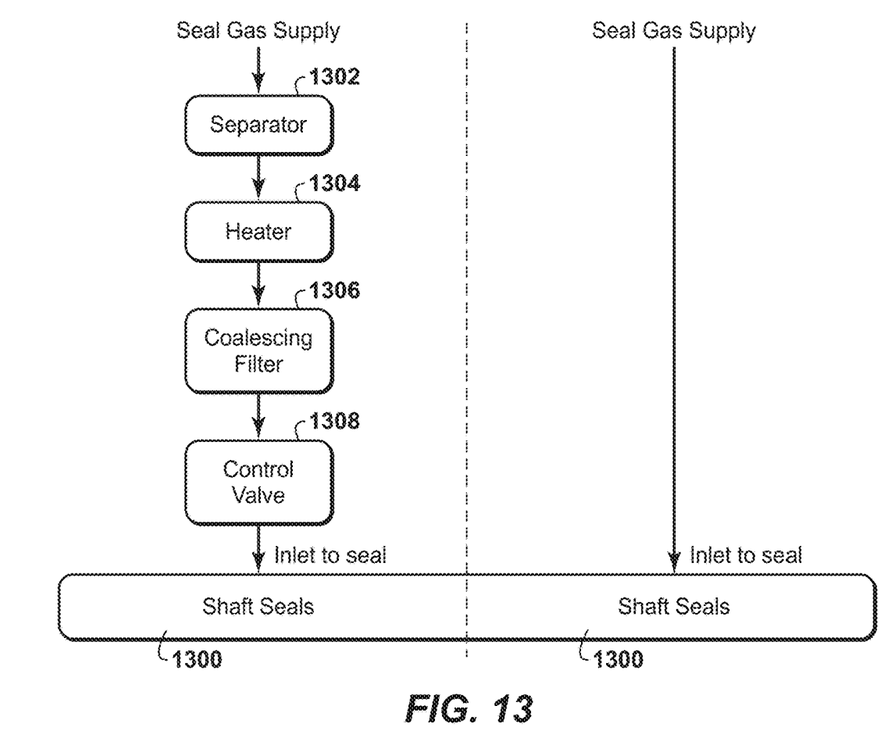
FIG. 13 is a schematic diagram showing components in a buffer gas system for a seal shaft.

FIG. 13 is a schematic depiction of the benefits of eliminating a gas buffer system according to aspects of the disclosure. On the left is shown the components necessary to operate the gas buffer system with seals 1300 for a rotating shaft, including a separator 1302, a heater 1304, a coalescing filter 1306, and a control valve 1308. Not shown are redundant components, miscellaneous valves, instruments, heat tracing, and other components that may be part of the gas buffer system. In contrast, actively monitoring and controlling the gap between seal faces eliminates all of these components as shown on the right side of FIG. 13, thereby reducing complexity, costs, and maintenance requirements for the seal system.

Eliminating the buffer system removes a large percentage of causes for contamination and subsequent dry gas seal failure. The usefulness of buffer gas is largely reduced if the seal faces are actively controlled such that they never touch. In other words, the axial gap between seal faces, or the film thickness, is no longer dependent on buffer gas pressures, buffer gas composition, or even aerodynamic forces.

Additionally, eliminating the buffer supply system improves compressor system efficiency by eliminating the work required to compress the volume of buffer gas which normally leaks through the process labyrinth and into the machine. Buffer gas flows can range from approximately 200-4000 liters per minute, so eliminating the buffer gas system may significantly reduce power requirements of the compressor system.

Typical maximum axial displacements for dry gas seals can range from +/−2.5 mm to +/−4-5 mm.

This method and device is applicable to various dry gas seal configurations, such as single seal, double seal, tandem seal with interstage labyrinths and tandem seal without interstage labyrinths, bi-directional or uni-directional rotating rings, and any machine which has the ability to use dry gas seals. Furthermore, the disclosed method and device may be applicable to other types of seal configurations.

In another aspect, one of the seals may be actively controlled, according to methods disclosed herein, to run at a maximum gap size, and only controlled to create a smaller gap size when the other of the seals is known to be degrading. This aspect provides a method of operation that increases the time between routine scheduled maintenance, thereby reducing maintenance costs.

Figure 14:
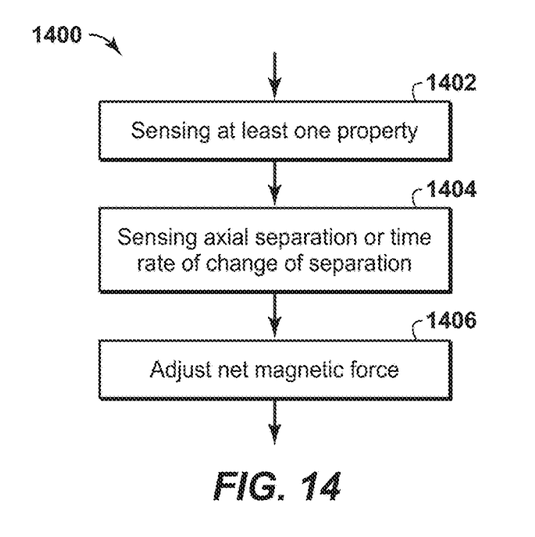
FIG. 14 is a flowchart showing a method according to disclosed aspects.

FIG. 14 is a flowchart of a method 1400 of actively controlling an axial separation between a seal face of a stationary ring and a seal face of a rotating ring of a gas seal. At block 1402 at least one property is sensed indicative of a condition of at least one of the seal face of the stationary ring and the seal face of the rotating ring. At block 1404 there is sensed, with at least one sensing device, at least one of (i) the axial separation between the seal face of the stationary ring and the seal face of the rotating ring, and (ii) the time rate of change of the axial separation. At block 1406 a net magnetic force of at least one magnetic device is adjusted based on the at least one property and at least one of the sensed axial separation and the sensed time rate of change of the separation, wherein adjusting the net magnetic force of the at least one magnetic device adjusts the axial separation between the seal face of the stationary ring and the seal face of the rotating ring. Without using a buffer gas between the seal faces, flow of gas or other fluid between said seal faces is controlled by adjusting the axial separation.

The steps depicted in FIGS. 5, 6, and 14 are provided for illustrative purposes only and a particular step may not be required to perform the disclosed methodology. Moreover, FIGS. 5, 6, and 14 may not illustrate all the steps that may be performed. The claims, and only the claims, define the disclosed system and methodology. For example, the measured gap or clearance may be used as a means for calculating gas or fluid flow across the seal(s). This concept may be used to eliminate buffer or vent instrumentation and/or hardware, optimize control of the DGS to improve compressor efficiency (and thereby consume less gas), and/or control the gap or clearance for barrier seals to optimize barrier fluid consumption.

Embodiments of the invention may include any combinations of the methods and systems shown in the following numbered paragraphs. This is not to be considered a complete listing of all possible embodiments, as any number of variations can be envisioned from the description above.

1. A method of actively controlling an axial separation between a seal face of a stationary ring and a seal face of a rotating ring of a gas seal, the method comprising:
   a) sensing at least one property indicative of a condition of at least one of the seal face of the stationary ring and the seal face of the rotating ring;
   b) sensing, with at least one sensing device, at least one of
      i. the axial separation between the seal face of the stationary ring and the seal face of the rotating ring, and
      ii. a time rate of change of the axial separation;
   c) adjusting a net magnetic force of at least one magnetic device based on the at least one property and at least one of the sensed axial separation and the sensed time rate of change of the separation, wherein adjusting the net magnetic force of the at least one magnetic device adjusts the axial separation between the seal face of the stationary ring and the seal face of the rotating ring; and
   without using a buffer gas between said seal faces, controlling flow of gas or other fluid between said seal faces by adjusting the axial separation.

2. The method of paragraph 1, wherein the at least one property of the gas or fluid is selected from
   pressure of the gas or other fluid, and
   temperature of at least one of the stationary ring and the rotating ring.

3. The method of paragraphs 1 or 2, wherein the condition of at least one of said seal faces is a pressure of gas therebetween.

4. The method of paragraphs 1 or 2, wherein the condition of at least one of said seal faces is a temperature of at least one of said seal faces.

5. The method of paragraphs 1 or 2, wherein the condition of at least one of said seal faces is a degradation of least one of said seal faces.

6. The method of any of paragraphs 1-5, wherein at least one of said seal faces has no surface features.

7. The method of any of paragraphs 1-6, wherein at least one of said seal faces has a surface feature designed to create a tortuous path for gas passing between said seal faces.

8. The method of paragraph 7, wherein the surface feature comprises at least one of a taper, chamfer, fillet, and bevel.

9. The method of paragraph 7, wherein the surface feature is at least one of a spherical, frusto-spherical, conical, frusto-conical, labyrinthine, toothed, and an embattled geometry.

10. The method of paragraph 7, wherein said seal faces have a complementary shape with each other.

11. The method of any of paragraphs 1-10, wherein the at least one magnetic device is at least one electromagnet, and wherein adjusting the net magnetic force comprises adjusting a field strength of the at least one electromagnet.

12. The method of paragraph 11, further comprising powering the at least one electromagnet from an external source or from an energy harvesting system that generates power.

13. The method of any of paragraphs 1-10, wherein the at least one magnetic device comprises first, second, and third independently controllable electromagnetic devices, and further comprising disposing the first, second, and third magnetic devices around a circumference of a rotating element of the rotating device, and wherein adjusting the net magnetic force comprises independently adjusting at least one of the first, second, and third magnetic devices to control the axial separation between the seal face of the stationary ring and the seal face of the rotating ring at more than one angular position.

14. The method of any of paragraphs 1-13, wherein the at least one magnetic device comprises at least one passive magnetic device.

15. The method of any of paragraphs 1-13, wherein the at least one magnetic device comprises a first array of passive magnetic devices and a second array of passive magnetic devices axially movable with respect to the first array of passive magnetic devices, and wherein adjusting the net magnetic force comprises moving the second array of passive magnetic devices such that polarities of passive magnetic devices in said first and second arrays interact to vary the net magnetic force of the first and second arrays.

16. The method of any of paragraphs 1-15, wherein adjusting the net magnetic force comprises adjusting the net magnetic force in an oscillating fashion such that the axial separation between the seal face of the rotating ring and the seal face of the stationary ring is variable around the circumference of the sealing elements.

17. The method of any of paragraphs 1-16, wherein the gas seal is a dry gas seal.

18. A gas seal system, comprising:
a stationary ring having a seal face;
a rotating ring having a seal face positioned adjacent the stationary ring seal face, the rotating ring configured to rotate about an axis with respect to the stationary ring, at least one of the stationary ring and the rotating ring configured to move axially with respect to each other;
a first sensor configured to sense at least one property indicative of a condition of at least one of the stationary ring seal face and the rotating ring seal face;
a second sensor configured to sense at least one of
i. the axial separation between the stationary ring seal face and the rotating ring seal face, and
ii. a time rate of change of the axial separation; and
a controller configured to adjust a net magnetic force of at least one magnetic device based on the at least one property and at least one of the sensed axial separation and the sensed time rate of change of the separation, wherein adjusting the net magnetic force adjusts the axial separation to thereby control, without using a buffer gas, flow of a gas or other fluid therethrough.

19. The gas seal system of paragraph 18, wherein the at least one property of the gas or fluid is selected from
pressure of the gas or other fluid, and
temperature of at least one of the stationary ring and the rotating ring.

20. The gas seal system of paragraphs 18 or 19, wherein the condition of at least one of the stationary ring seal face and the rotating ring seal face is one of
a pressure of gas between the stationary ring seal face and the rotating ring seal face,
a temperature of at least one of the stationary ring seal face and the rotating ring seal face, and
a degradation of least one of the stationary ring seal face and the rotating ring seal face.

21. The gas seal system of any of paragraphs 18-20, wherein at least one of the stationary ring seal face and the rotating ring seal face has no surface features.

22. The gas seal system of any of paragraphs 18-21, wherein at least one of the stationary ring seal face and the rotating ring seal face has a surface feature designed to create a tortuous path for gas passing between said seal faces.

23. The gas seal system of paragraph 22, wherein the surface feature comprises at least one of a taper, chamfer, fillet, and bevel.

24. The gas seal system of paragraphs 22 or 23, wherein the surface feature is at least one of a spherical, frusto-spherical, conical, frusto-conical, labyrinthine, toothed, and an embattled geometry.

25. The gas seal system of any of paragraphs 21-24, wherein said seal faces have a complementary shape with each other.

26. The gas seal system of any of paragraphs 18-25, wherein the at least one magnetic device is at least one electromagnet, and wherein adjusting the net magnetic force adjusts a field strength of the at least one electromagnet.

27. The gas seal system of paragraph 26, further comprising an energy harvesting system configured to power the at least one electromagnet.

28. The gas seal system of any of paragraphs 18-27, wherein the at least one magnetic device comprises first, second, and third independently controllable electromagnetic devices disposed around a circumference of a rotating element of the rotating device, and wherein the net magnetic force is adjusted by independently adjusting at least one of the first, second, and third magnetic devices to control the axial separation between the stationary ring seal face and the rotating ring seal face at more than one angular position.

29. The gas seal system of any of paragraphs 18-28, wherein the at least one magnetic device comprises at least one passive magnetic device.

30. The gas seal system of any of paragraphs 18-29, wherein the at least one magnetic device comprises a first array of passive magnetic devices and a second array of passive magnetic devices axially movable with respect to the first array of passive magnetic devices, wherein the controller adjusts the net magnetic force by moving the second array of passive magnetic devices such that polarities of passive magnetic devices in said first and second arrays interact to vary the net magnetic force of the first and second arrays.

31. The gas seal system of any of paragraphs 18-30, wherein the gas seal is a dry gas seal.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method of actively controlling an axial separation between a seal face of a stationary ring and a seal face of a rotating ring of a gas seal, the method comprising:
a) sensing at least one property indicative of a condition of at least one of the seal face of the stationary ring and the seal face of the rotating ring;
b) sensing, with at least one sensing device, at least one of
i. the axial separation between the seal face of the stationary ring and the seal face of the rotating ring, and
ii. a time rate of change of the axial separation;
c) adjusting a net magnetic force of at least one magnetic device based on the at least one property and at least one of the sensed axial separation and the sensed time rate of change of the separation, wherein adjusting the net magnetic force of the at least one magnetic device adjusts the axial separation between the seal face of the stationary ring and the seal face of the rotating ring; and
d) without using a buffer gas between said seal faces, controlling flow of gas or other fluid between said seal faces by adjusting the axial separation.

2. The method of claim 1, wherein the at least one property of the gas or fluid is selected from
pressure of the gas or other fluid, and
temperature of at least one of the stationary ring and the rotating ring.

3. The method of claim 1, wherein the condition of at least one of said seal faces is a pressure of gas therebetween.

4. The method of claim 1, wherein the condition of at least one of said seal faces is a temperature of at least one of said seal faces.

5. The method of claim 1, wherein the condition of at least one of said seal faces is a degradation of least one of said seal faces.

6. The method of claim 1, wherein at least one of said seal faces has no surface features.

7. The method of claim 1, wherein at least one of said seal faces has a surface feature designed to create a tortuous path for gas passing between said seal faces.

8. The method of claim 7, wherein the surface feature comprises at least one of a taper, chamfer, fillet, and bevel.

9. The method of claim 7, wherein the surface feature is at least one of a spherical, frusto-spherical, conical, frusto-conical, labyrinthine, toothed, and an embattled geometry.

10. The method of claim 7, wherein said seal faces have a complementary shape with each other.

11. The method of claim 1, wherein the at least one magnetic device is at least one electromagnet, and wherein adjusting the net magnetic force comprises adjusting a field strength of the at least one electromagnet.

12. The method of claim 11, further comprising powering the at least one electromagnet from an external source or from an energy harvesting system that generates power.

13. The method of claim 1, wherein the at least one magnetic device comprises first, second, and third independently controllable electromagnetic devices, and further comprising disposing the first, second, and third magnetic devices around a circumference of a rotating element of the rotating device, and wherein adjusting the net magnetic force comprises independently adjusting at least one of the first, second, and third magnetic devices to control the axial separation between the seal face of the stationary ring and the seal face of the rotating ring at more than one angular position.

14. The method of claim 1, wherein the at least one magnetic device comprises at least one passive magnetic device.

15. The method of claim 1, wherein the at least one magnetic device comprises a first array of passive magnetic devices and a second array of passive magnetic devices axially movable with respect to the first array of passive magnetic devices, and wherein adjusting the net magnetic force comprises moving the second array of passive magnetic devices such that polarities of passive magnetic devices in said first and second arrays interact to vary the net magnetic force of the first and second arrays.

16. The method of claim 1, wherein the gas seal is a dry gas seal.

17. The method of claim 1, further comprising:
calculating a leakage of the gas or other fluid between said seal face using
a sensed pressure of the gas or other fluid, and
the axial separation or an equivalent orifice area.

18. A method of actively controlling an axial separation between a seal face of a stationary ring and a seal face of a rotating ring of a gas seal, the method comprising:
a) sensing at least one property indicative of a condition of at least one of the seal face of the stationary ring and the seal face of the rotating ring;
b) sensing, with at least one sensing device, at least one of
  i. the axial separation between the seal face of the stationary ring and the seal face of the rotating ring, and
  ii. a time rate of change of the axial separation;
c) adjusting a net magnetic force of at least one magnetic device based on the at least one property and at least one of the sensed axial separation and the sensed time rate of change of the separation, wherein adjusting the net magnetic force of the at least one magnetic device adjusts the axial separation between the seal face of the stationary ring and the seal face of the rotating ring, and wherein adjusting the net magnetic force comprises adjusting the net magnetic force in an oscillating fashion such that the axial separation between the seal face of the rotating ring and the seal face of the stationary ring is variable around the circumference of the sealing elements; and
d) without using a buffer gas between said seal faces, controlling flow of gas or other fluid between said seal faces by adjusting the axial separation.

19. A gas seal system, comprising:
a stationary ring having a seal face;
a rotating ring having a seal face positioned adjacent the stationary ring seal face, the rotating ring configured to rotate about an axis with respect to the stationary ring, at least one of the stationary ring and the rotating ring configured to move axially with respect to each other;
a first sensor configured to sense at least one property indicative of a condition of at least one of the stationary ring seal face and the rotating ring seal face;
a second sensor configured to sense at least one of
  i. the axial separation between the stationary ring seal face and the rotating ring seal face, and
  ii. a time rate of change of the axial separation; and
a controller configured to adjust a net magnetic force of at least one magnetic device based on the at least one property and at least one of the sensed axial separation and the sensed time rate of change of the separation, wherein adjusting the net magnetic force adjusts the axial separation to thereby control, without using a buffer gas, flow of a gas or other fluid therethrough.

20. The gas seal system of claim 19, wherein the at least one property of the gas or fluid is selected from
pressure of the gas or other fluid, and
temperature of at least one of the stationary ring and the rotating ring.

21. The gas seal system of claim 19, wherein the condition of at least one of the stationary ring seal face and the rotating ring seal face is one of
a pressure of gas between the stationary ring seal face and the rotating ring seal face,
a temperature of at least one of the stationary ring seal face and the rotating ring seal face, and
a degradation of least one of the stationary ring seal face and the rotating ring seal face.

22. The gas seal system of claim 19, wherein at least one of the stationary ring seal face and the rotating ring seal face has no surface features.

23. The gas seal system of claim 22, wherein said seal faces have a complementary shape with each other.

24. The gas seal system of claim 19, wherein at least one of the stationary ring seal face and the rotating ring seal face has a surface feature designed to create a tortuous path for gas passing between said seal faces.

25. The gas seal system of claim 24, wherein the surface feature comprises at least one of a taper, chamfer, fillet, and bevel.

26. The gas seal system of claim 24, wherein the surface feature is at least one of a spherical, frusto-spherical, conical, frusto-conical, labyrinthine, toothed, and an embattled geometry.

27. The gas seal system of claim 19, wherein the at least one magnetic device is at least one electromagnet, and wherein adjusting the net magnetic force adjusts a field strength of the at least one electromagnet.

28. The gas seal system of claim 27, further comprising an energy harvesting system configured to power the at least one electromagnet.

29. The gas seal system of claim 19, wherein the at least one magnetic device comprises first, second, and third independently controllable electromagnetic devices disposed around a circumference of a rotating element of the rotating device, and wherein the net magnetic force is adjusted by independently adjusting at least one of the first, second, and third magnetic devices to control the axial separation between the stationary ring seal face and the rotating ring seal face at more than one angular position.

30. The gas seal system of claim 19, wherein the at least one magnetic device comprises at least one passive magnetic device.

31. The gas seal system of claim 19, wherein the at least one magnetic device comprises a first array of passive magnetic devices and a second array of passive magnetic devices axially movable with respect to the first array of passive magnetic devices, wherein the controller adjusts the net magnetic force by moving the second array of passive magnetic devices such that polarities of passive magnetic devices in said first and second arrays interact to vary the net magnetic force of the first and second arrays.

32. The gas seal system of claim 19, wherein the gas seal is a dry gas seal.

\* \* \* \* \*